No. 725,067. PATENTED APR. 14, 1903.
W. GARDINER & J. R. MACMILLAN.
STORAGE BATTERY.
APPLICATION FILED JAN. 31, 1902.
NO MODEL.
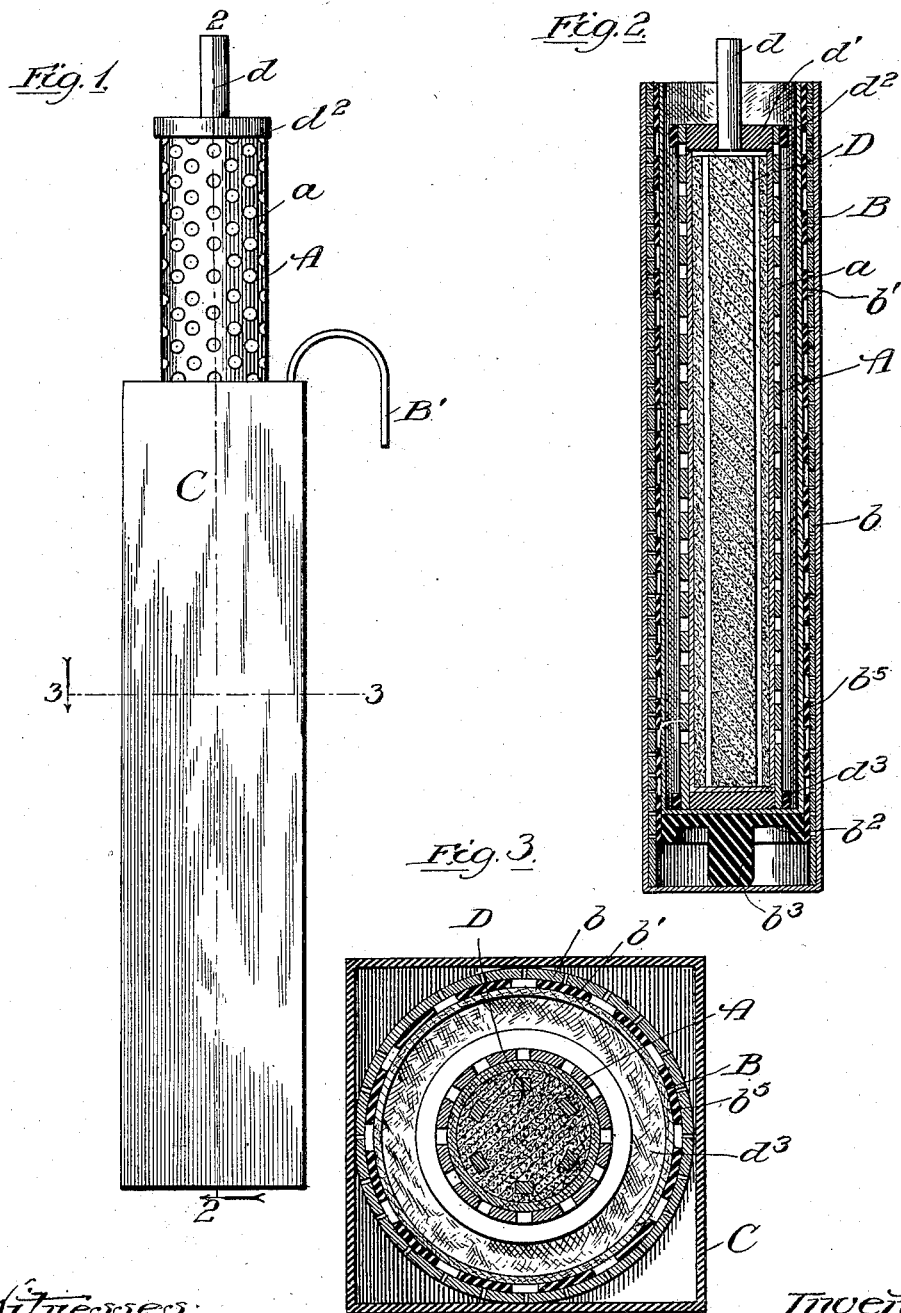

UNITED STATES PATENT OFFICE.

WILLIAM GARDINER, OF CHICAGO, ILLINOIS, AND JAMES R. MACMILLAN, OF MENOMINEE, WISCONSIN, ASSIGNORS TO NORTHWESTERN STORAGE BATTERY COMPANY, A CORPORATION OF ILLINOIS.

STORAGE BATTERY.

SPECIFICATION forming part of Letters Patent No. 725,067, dated April 14, 1903.

Application filed January 31, 1902. Serial No. 91,878. (No model.)

*To all whom it may concern:*

Be it known that we, WILLIAM GARDINER, a resident of the city of Chicago, Cook county, Illinois, and JAMES R. MACMILLAN, a resident of the city of Menominee, county of Dunn, and State of Wisconsin, citizens of the United States, have invented certain new and useful Improvements in Storage Batteries; and we do hereby declare that the following is a full, clear, and exact description thereof, reference being had to the accompanying drawings, and to the letters of reference marked thereon, which form a part of this specification.

This invention relates to improvements in storage batteries, and more particularly to a storage battery or secondary cell designed to provide a cell having high efficiency at a low cost, also designed to occupy a relatively small space.

The invention consists in the matters hereinafter described, and more fully pointed out and defined in the appended claims.

In the drawings, Figure 1 is a side elevation of the cell, showing the same with the positive-pole electrode in a raised position. Fig. 2 is a section taken on line 2 2 of Fig. 1, with the positive-pole electrode in position in the cell. Fig. 3 is an enlarged transverse section on line 3 3 of Fig. 1.

In said drawings the positive-pole electrode A fits closely within the negative electrode B. As shown, both are tubular and fit closely in a cell-jar, which may be cylindrical or rectangular, as preferred. The outermost or negative-pole electrode, as shown, comprises a perforated cylindrical shell $b$ of chemically-formed sheet-lead, which fits closely about a similar perforated cylindric shell of hard rubber or other insulating material, (indicated by $b'$.) Said insulating-shell is provided with a closed bottom $b^2$, having a central downward projection $b^3$, adapted to support the bottom of the shell. Within the cylindrical shell of insulating material is provided a lining of canvas or other fabric, (indicated by $b^5$,) which is permanently pasted, cemented, or otherwise attached upon the inner wall of said insulating-shell and which may also cover the bottom of said shell, if preferred. The positive-pole element A is of less diameter than the element B and comprises a closely-perforated cylindrical shell of hard rubber or other insulating material, (indicated by $a$,) within which is also secured a lining of canvas, fabric, or other suitable material, which acts to prevent the active material from escaping therefrom. Any one of several different forms of active material may be used. Preferably, however, the active material used comprises finely granular or comminuted lead in as nearly a pure state as can conveniently be obtained, or, if preferred, the same may contain more or less mercury. Extending downwardly into said active material is a bar or bars D of relatively pure lead, which may also be chemically formed, if preferred, and which, as shown in the drawings, in which six of such bars or rods are indicated, may be integrally connected at the top in a conductor $d$. The upper end of said insulating-shell $a$ is filled with wax or other material $d'$, through which the conductor B projects, with the effect of effectually sealing the upper end of the shell. The lower end of said shell $a$ is filled with hard rubber or the like, which rests in the bottom of the shell $b'$.

The electrolyte used in a cell such as described may be sulfuric acid or other preferred fluid, in which both electrodes are submerged.

The operation is as follows: Where sulfuric acid is used, the usual reactions take place, the comminuted active material of lead and the bars or rods D being changed into lead peroxid and the shell $b$ changed into spongy lead. Inasmuch as said active material in the positive-pole electrode is in a comminuted or finely-granular form, practically all of the same is turned very quickly into a peroxid in charging, and owing to its close relation with the rods D high current efficiency is assured.

Obviously, if preferred, it is not essential that said casings be cylindric or rectangular, as shown, inasmuch as the same may be conveniently made in hexagonal or other prismatic form adapted to greatly economize space by fitting very closely together in a case or the like. If preferred, also, separating-strips in the form of rubber washers (indicated by $d^2$ and $d^3$) may be secured upon the ends of the inner electrode-shell, as shown in Figs. 1, 2, and 3, for the purpose of holding the electrodes properly spaced from each other. While lead has been mentioned as the metal used and sulfuric acid as the electrolyte, other metals may be utilized in cells constructed as described, and different electrolytes may be employed.

Many details of the construction may be varied without departing from the principles of this invention.

We claim as our invention—

1. The combination in a secondary cell, an inner tubular electrode containing active material in a finely-comminuted form, washers of insulating material on said electrode acting as separators, a fabric lining in each of said tubular electrodes and a complemental electrode also in tubular form within which said last-named electrode fits.

2. The combination with a tubular electrode closely perforated, of an insulating-shell within the same, a lining fabric therein, a complemental electrode, also tubular, and comprising a perforated shell containing active materials in a finely-comminuted form, washers of insulating material on said inner electrodes spacing the same from the outer, and one or more metallic rods extending downwardly in said active material and connected in a conductor at their outer ends.

3. The combination with a perforated outer tubular electrode of chemically-formed sheet metal, of perforated inner insulating-casing fitting closely within the same, an insulating-base thereon, an inner electrode also tubular in form and comprising an outer perforated shell, an inner lining fabric, active material therein comprising finely-comminuted lead, one or more rods of relatively pure lead extending downwardly through said active material and integrally connected at their tops in a conductor, separating-washers on said inner electrode spacing the same from the outer, a jar adapted to contain said elements and an electrolyte filling said jar and in which said elements are submerged.

4. The combination with an outer shell of perforated and chemically formed sheet-lead, of a shell of insulating material fitting closely within the same and forming a support therefor, a lining fabric in said insulating-shell, an inner electrode comprising a perforated shell, a fabric covering one side thereof and finely-comminuted active material contained in said shell, and a conductor extending above the cell divided at its lower end into a plurality of parts extending downwardly in the active material and the upper end of said shell being hermetically sealed.

5. The combination in a secondary battery, in a containing-jar of an outer tubular electrode of perforated metal, an apertured insulating-shell supporting said electrode, a lining fabric thereon, an inner electrode comprising a perforated shell of insulating material, a sheath of fabric covering one side thereof, active material in shell, rods of metal extending downwardly therein and connected at their upper end to form a conductor and a ring of insulating material on each end of the inner sheath.

6. A storage battery comprising an outer perforated tube of metal, an inner core of finely-comminuted metal insulated therefrom, rods of metal similar to the comminuted metal extending downwardly therein and forming a conductor, and an electrolyte adapted to act on one or more of said metallic bodies.

7. A storage battery comprising an outer perforated tube of spongy lead, an inner core of finely-comminuted lead insulated therefrom, rods of metal similar to the comminuted metal extending downwardly therein and forming a conductor, and an electrolyte adapted to act on one or more of said metallic bodies.

In witness whereof we have hereunto subscribed our names in the presence of two subscribing witnesses.

WILLIAM GARDINER.
JAMES R. MACMILLAN.

Witnesses:
C. W. HILLS,
ALFRED C. ODELL.